March 20, 1956 R. S. ROBINS 2,739,228
ILLUMINATOR FOR PHOTOMICROGRAPHY
Filed May 21, 1952 2 Sheets-Sheet 1

INVENTOR
RICHARD S. ROBINS
BY
ATTORNEYS

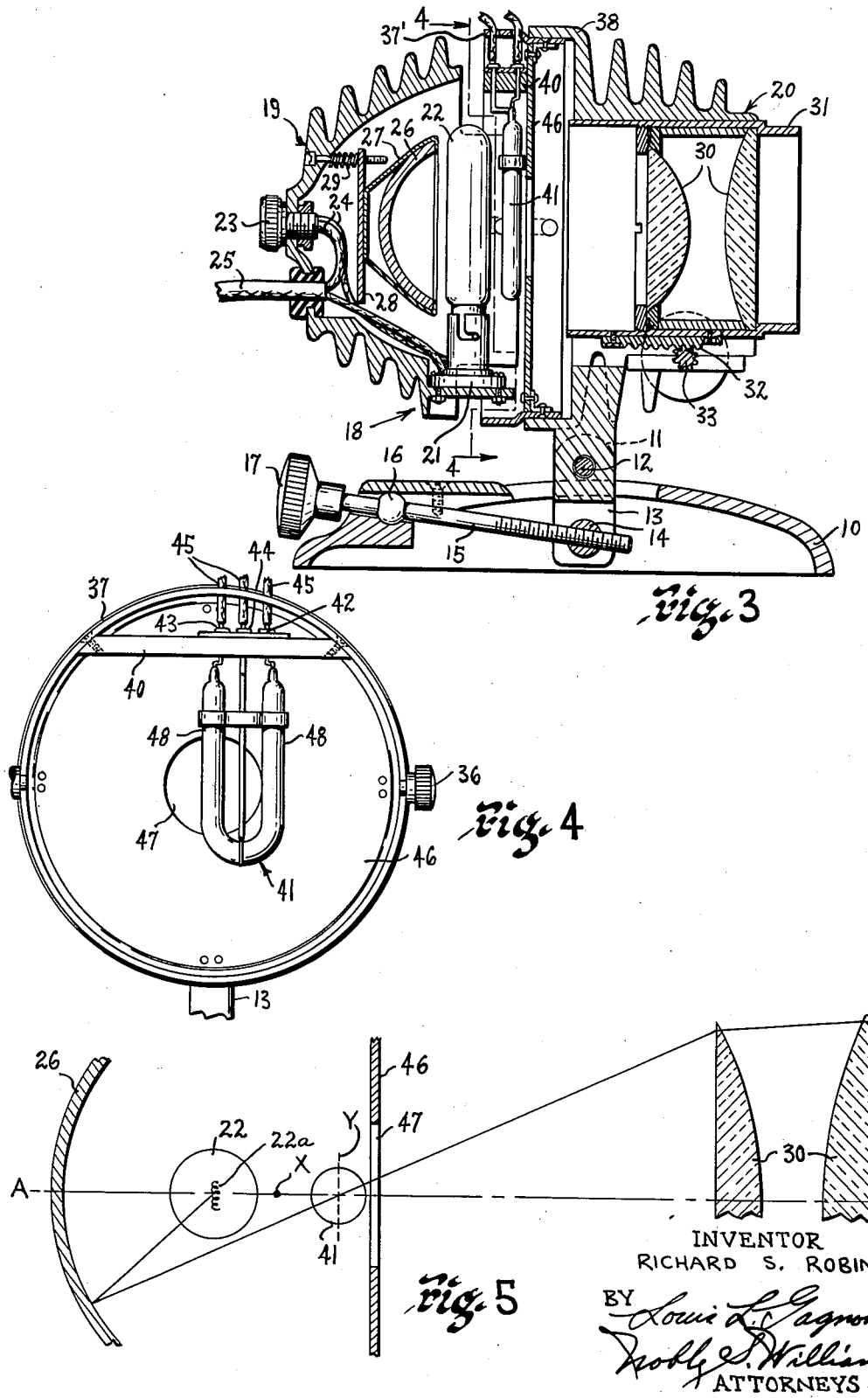

United States Patent Office 2,739,228
Patented Mar. 20, 1956

2,739,228

ILLUMINATOR FOR PHOTOMICROGRAPHY

Richard S. Robins, Ithaca, N. Y., assignor to American Optical Company, Southbridge, Mass., a voluntary association of Massachusetts Application May 21, 1952, Serial No. 289,117

6 Claims. (Cl. 240—41.3)

This invention relates to improvements in illuminating devices and has particular reference to illuminators of the type used for illumination of specimens to be viewed and photographed through a microscope or like optical instrument.

Microscope lamps for illuminating a specimen to be viewed and photographed through a microscope broadly are not new. However, the amount of light required for efficiently photographing specimens through a microscope is far greater than the amount of light required or the amount that could be conveniently used for continuous visual microscopical inspection of the specimen. For this reason heretofore two and sometimes more lamps of greatly differing light outputs were employed. More recently attempts have been made to combine such high and low output microscope lamps into a single "double duty" type of device or lamp capable of performing for both of the above functions. However, these earlier combined microscope lamps or illuminators while being fairly efficient have not been entirely satisfactory for they were too large to be convenient and were of too expensive a construction. One such combined device of earlier construction employed separate high and low intensity light sources, but to function properly also required a separate condenser lens system for each light source, thus causing the resultant device to be costly and undesirably bulky.

It has been found in accordance with the present invention that very efficient results may be obtained in a microscope lamp or illuminator by carefully controlling the relative relation of two separate sources of illumination with respect to a curved reflector or mirror and generally relative to a single condenser lens system thereof; whereby only one lens system is required, thereby considerably reducing the ultimate cost and enabling the overall dimensions and weight of the complete lamp or device to be considerably reduced with the result that the device is more saleable and may be more conveniently and efficiently manipulated.

It is, accordingly, a principal object of the present invention to provide a microscope lamp or illuminator embodying a relatively low intensity source of illumination, a relatively high intensity source of illumination, a reflector having a center of curvature, and a condenser lens system with said sources of illumination located in controlled optically aligned spaced relation between and relative to said curved reflector and said condenser lens system and with said sources of illumination being further located in predetermined axially aligned and substantially equally spaced relation to and at opposite sides of said center of curvature of said reflector whereby one of said sources of illumination is located substantially at a predetermined image plane in said illuminator and the other of said sources of illumination is so located relative to said reflector that an image thereof will be formed substantially at said predetermined image plane.

Another object is to provide a microscope lamp or illuminator embodying a relatively low intensity source of illumination such as a filament type lamp which may be operated continuously when desired located in controlled spaced relation between and relative to a curved reflector or mirror and a relatively high intensity light source such as a flashtube and in controlled relation to a condenser lens system of the device whereby the reflector will reflect the image and illumination from the low intensity source directly toward and substantially at the plane of the high intensity source while the condenser lens system is located in spaced axially aligned relation to said high intensity source for directing substantially all the usable light emanating from said plane, whether originating from the high intensity or from the low intensity source, onto a specimen.

Another object is to provide an illuminating device embodying an optical system comprising, in optical alignment, a reflector having a curved reflecting surface, a light source capable of emitting light continuously positioned between said reflector and its center of curvature so that an image of said continuous light source will be formed at a predetermined location, and a high intensity light source located at said predetermined location and in proper spaced relation to a condenser lens system of said device, whereby a greater part of the usable light from said continuous light source or said high intensity light source will be efficiently collected and directed by said condenser lens system towards an object to be illuminated.

Another object is to provide an illuminating device of the above character embodying a diaphragm located adjacent to and slightly forward of said high intensity light source for preventing escape of stray light within the system and also restricting the size of the usable area of the high intensity light source.

Other objects and advantages of the invention will become apparent from the following description taken in connection with the accompanying drawings, in which:

Fig. 3 is a vertical sectional view taken substantially on line 3—3 of Fig. 2 looking in the direction of the arrows;

Fig. 4 is a vertical sectional view taken substantially on line 4—4 of Fig. 3 looking in the direction of the arrows; and Fig. 5 is a schematic diagram of the optical system embodied in the present invention.

Figure 1:
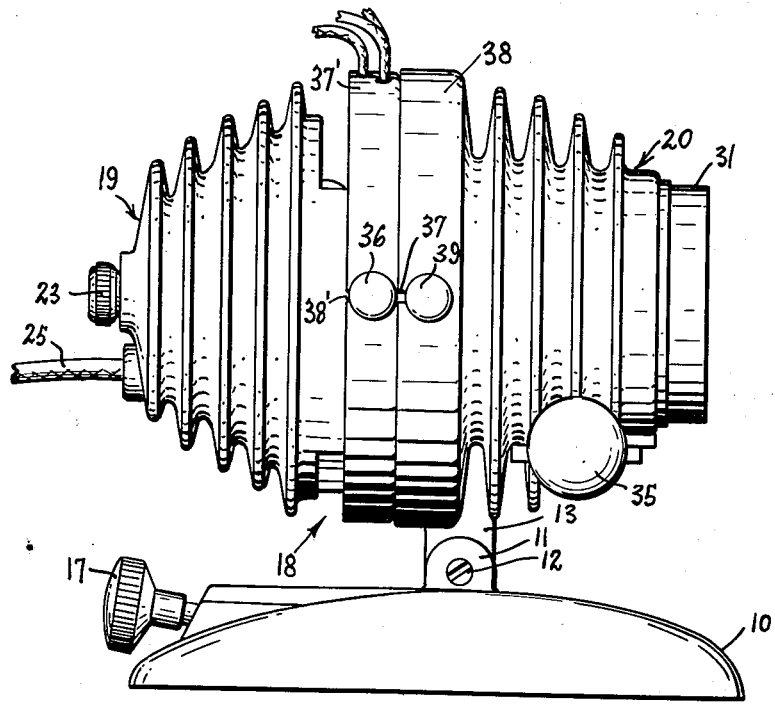
Fig. 1 is a side elevational view of an illuminator embodying the invention.

Referring to the drawings wherein like characters of reference designate like parts throughout the several views, the illustrated device embodying the invention comprises a hollow base 10 on the upper surface of which are vertically extending ears 11 carrying a pivot 12 therebetween. A supporting member 13 is pivotally mounted on the pivot 12 and has one end which extends into the interior of the base 10 and carries a ball joint 14 (Fig. 3). To the ball joint 14 is threadedly connected a shaft 15 which is adjustably mounted in the base 10 by a ball joint connection 16 and which has a knurled knob 17 secured to its outer end. By manual rotation of the knob 17 the operator of the device can cause forward or rearward inclination of the supporting member 13 to a desired angular relation to the base 10.

On the supporting member 13 is a lamphouse 18 comprising a rear housing 19 and a front housing 20. The rear housing 19 carries a lamp socket 21 which has mounted therein a lamp 22 preferably of a type having a filament 22a which will emit light continuously when operated. A switch 23 for controlling operation of the lamp 22 is mounted on the rear housing 19 and is electrically connected to one of a pair of electrical leads 24.

The leads 24 are provided in a conventional two-wire cable 25, one lead leading to the switch 23 and thence to the base of the lamp 22 and the other lead being connected directly to the lamp socket 21. Thus, electrical energy is supplied to the switch 23 and lamp 22 from any suitable available source.

The rear housing 19 also carries a reflector 26 of predetermined curvature located with its reflecting surface directed toward the lamp 22, the reflector 26 and lamp 22 being axially aligned and so relatively spaced that the lamp 22 is positioned between the reflector 26 and its center of curvature X (Fig. 5). Thus, the reflector 26 will reflect an image of said lamp filament 22a to an image plane Y which is located at an equal distance from the center X on the opposite side thereof. The reflector 26 is mounted in the rear housing 19 by any suitable means such as a holder 27 which is fixedly attached to a plate 28 which in turn is connected to a stud 29 carried by the rear housing 19.

While only one stud 29 and surrounding compression spring has been shown, preferably three equidistantly spaced studs would be employed for allowing the reflector to be accurately adjusted so as to locate its center of curvature in optical alignment with the optical axis of the condenser lens system of the device to be presently described. The reflector 26 would normally be for ease of manufacture in the form of a spherical first surface mirror but it should be appreciated that a parabolic or aspheric reflector could be substituted successfully when following the principles of the present invention as to locations for the light sources employed.

Figure 2:
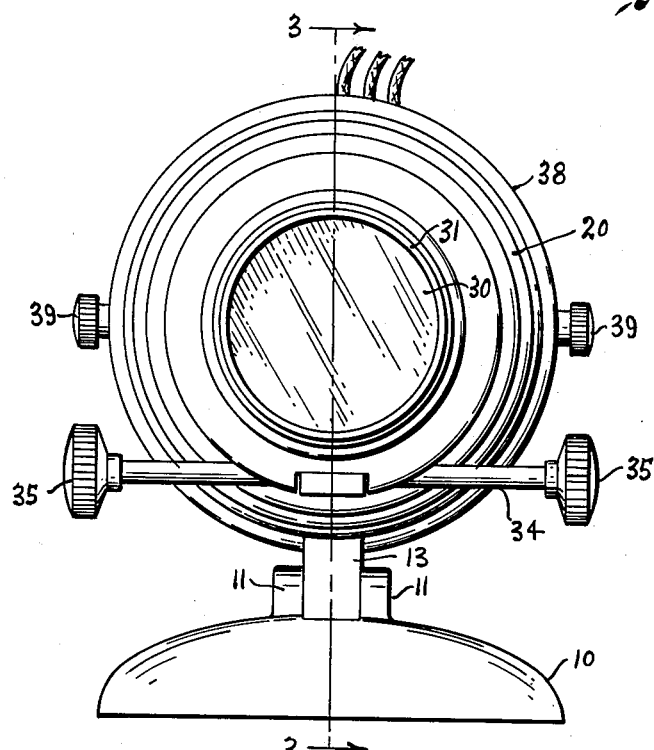
Fig. 2 is a front elevational view of the illuminator shown in Fig. 1.

The front housing 20 contains the objective lens system 30 and holder 31 therefor which is adapted to be adjusted in a direction toward and away from the lamp 22 so as to focus the light from within the lamphouse 18 upon a suitable object such as a specimen positioned for viewing through a microscope. Thus adjustment is accomplished by a rack 32 which is connected to the holder 31 and which meshes with a pinion 33 carried substantially centrally of a shaft 34 (Fig. 2) which extends transversely of the device and is rotatably mounted in the under side of the front housing 20.

The shaft 34 is provided on each end with a knob 35 whereby the device may be manually operated to adjust the lens system 30 in a direction toward or away from the lamp 22.

With a device constructed as described above it is evident that illumination from the lamp 22 will pass therefrom through the image plane Y and thence through the lens system 30 to the object being illuminated.

In a conventional illuminator of this type the front housing 20 is secured to the supporting member 13 and the rear housing 19 is attached to the front housing 20 by set screws 36 (Fig. 1) which are mounted in the sides of the forward end of the rear housing 19 and are adapted to enter slots 37 provided therefor in the adjacent edge of the rim 38 forming the rear portion of the front housing 20. The housings 19 and 20 are thus normally retained in assembled relation by tightening the screws 36.

However, in accordance with this invention, additional illumination is desired for purposes of photomicrography. Therefore, a ring-like member 37' is inserted between the adjacent ends of the housings 19 and 20 and is provided with notches 38' for receiving the screws 36 and with screws 39 for entering the notches 37. Thus, the two housings 19 and 20 and ring-like member 37' form a complete enclosure for the optical elements of the device. The ring-like member 37' carries a transversely extending supporting plate 40 (Figs. 3 and 4) to which is attached a flashtube 41. The flashtube 41 may be of any conventional type commonly used for relatively intense illumination, the example illustrated in the drawings being substantially U-shaped, having design voltage of 1000, 100 maximum watt-seconds, and approximately 4400 maximum lumen-seconds. The flashtube 41 is provided with a cathode 42, an anode 43 and a trigger terminal 44 to each of which are connected leads 45 which respectively electrically connect the flashtube with portions of a conventional control circuit whereby the flashtube 41 may be operated as desired by the operator.

A diaphragm 46 is carried by the ring-like member 37' and is located adjacent to and immediately forwardly of the flashtube 41. The diaphragm 46 is provided with a central opening 47 therein of a controlled size whereby illumination from only one of the parallel portions 48 of the flashtube 41 will pass through the opening 47 in substantial amounts.

In accordance with this invention the reflector 26, lamp 22, usable portion of the flashtube 41, and lens system 30 are all aligned substantially on the axis A—A of the system (Fig. 5) with the usable portion 48 of the flashtube 41 being located at the image plane Y and the lamp 22 being located between the reflector 26 and its center of curvature X. Thus, it will be seen that to illuminate a specimen for viewing through a microscope, the lamp 22 will transmit direct illumination forwardly of the system to the flashtube 41, thence through the opening 47 in the diaphragm 46 and through the lens system 30 to the specimen, and in order to provide a maximum possible amount of light from the lamp 22 to pass to the specimen, the reflector 26 will also reflect rearwardly directed light rays from the lamp 22 toward the flashtube 41 whereupon the reflected image of the filament 22a of the lamp 22 will be formed at the center of the usable portion 48 of the flashtube 41 as described above. Thus, while obviously the flashtube 41 is illuminated by direct radiation from the lamp 22 it is also illuminated by focused radiation from the reflector 26, which radiation passes through the lens system 30, the diaphragm 46 reducing the unfocused radiation as well as cutting off excess off-center light from the flashtube's unused portion.

After a specimen has been properly located in the microscope, which locating process can be accomplished in the illumination from the lamp 22, additional illumination is provided as described by the flashtube 41 which is of sufficient intensity to permit photomicrography.

From the foregoing it is apparent that practically all illumination of the specimen, whether for viewing or photographing purposes, will seem to emanate from the flashtube 41. In the case of viewing, such illumination will be provided by the light rays from the lamp 22 and, in the case of photographing, the illumination will be provided directly by light emitted by the flashtube 41.

It is apparent also that by positioning the lamp 22 within the curve of the reflector 26 and shaping the reflector 26 in such a manner that light rays from the lamp 22 will be focused upon the flashtube 41, the overall length of the system is substantially reduced and additional lenses for focusing light from the lamp 22 upon the flashtube 41 are not required.

It is common practice in microscopy to arrange a conventional microscope lamp, equipped with an adjustable condenser lens system, so that it is focused substantially at the back aperture of the sub-stage condenser of the microscope and axially positioned so that the light beam of said lamp will substantially fully fill this aperture. The result of this arrangement is that the object field of the microscope will then be well and uniformly lighted when the microscope is in proper adjustment. It should be noted the lamp of the present invention should be, in like manner, properly focused and axially positioned relative to the sub-stage condenser of the microscope when in use. The light from the flashtube 41 cannot be conveniently focused and directed in this usual manner because of the extremely short duration of each flash, the time interval between flashes, and the extremely high light intensity thereof. However, since the image of the filament 22a of the low intensity light source 22 is formed substantially at the center of the flashtube 41 and may be continuous, it follows that when the low intensity light source is in proper adjustment for use with the microscope, the flashtube will automatically be likewise in proper adjustment relative to the microscope.

Although the foregoing description refers to the flashtube 41 as being located at the image plane of the reflector and to the low intensity source of lamp 22 as being within the curve of the reflector 26, it is to be understood that the flashtube 41 and lamp 22 may, if desired, be interchanged. The results in such a case will be satisfactory for many uses of the device. However, the construction as described hereinbefore is preferred since with the modified construction a shadow will be formed by the lamp filament which, with the lamp in the image plane, will become a small barrier and cause a consequent reduction in the illumination collected by the condenser lens system as reflected by the reflector.

It is to be further understood that although the flashtube 41 has been described as being of the type having a U-shaped structure, any suitable type of flashtube emitting sufficient illumination for the purposes set forth may be used.

A device constructed and arranged in accordance with these specifications will be of a size and weight only slightly greater than that of a conventional microscope illuminator, yet will also be capable of adequate performance over the extreme range necessary for efficient photomicrography in addition to being of a small, neat and compact arrangement, convenient to handle, and practical to use.

It will be apparent, however, that many changes may be made in the arrangement of parts shown and described without departing from the spirit of the invention. Therefore, it is to be understood that all material shown or described should be interpreted as illustrative and not in a limiting sense.

I claim:

1. In a microscope illumination device, the combination of a condenser lens system establishing an optical projection axis, a reflector having a concave spherical reflecting surface intersecting said axis and facing said condenser lens system, said concave spherical surface having its center of curvature disposed substantially at a predetermined location on said optical axis, a relatively low intensity substantially continuous source of illumination transversely positioned so as to intersect said optical axis at a point between said reflecting surface and said center of curvature, and at a first predetermined distance from said center of curvature, said reflector reflecting light from said low intensity source of illumination and forming an image thereof substantially at an image plane transversely intersecting said optical axis at a point a second predetermined distance substantially equal to said first predetermined distance from the opposite side of said center of curvature, and a relatively high intensity light source of short duration located substantially at said image plane and in optical alignment with said condenser lens system, said condenser lens system being axially adjustable so as to focus at said image plane and collect light rays emanating from said high intensity light source or from said low intensity light source and from same into a concentrated beam for use with the optical system of a microscope or the like.

2. In a microscope illumination device, the combination of a condenser lens system establishing an optical projection axis, a deflector having a concave spherical reflecting surface intersecting said axis and facing said condenser lens system, said concave spherical surface having its center of curvature disposed substantially at a predetermined location on said optical axis, a relatively low intensity substantially continuous source of illumination transversely positioned so as to intersect said optical axis at a point between said reflecting surface and said center of curvature, and at a first predetermined distance from said center of curvature, said reflector reflecting light from said low intensity source of illumination and forming an image thereof substantially at an image plane transversely intersecting said optical axis at a point a second predetermined distance substantially equal to said first predetermined distance from the opposite side of said center of curvature, a relatively high intensity light source of short duration located substantially at said image plane and in optical alignment with said condenser lens system, and a diaphragm between said high intensity light source and said condenser lens system and closely adjacent the former and having an axially aligned opening of controlled size therein for restricting the usable area of the light at said image plane exposed to said condenser lens system, said condenser lens system being axially adjustable so as to focus at said image plane and collect light rays emanating from said high intensity light source or from said low intensity light source and passing through said opening and form same into a concentrated beam for use with the optical system of a microscope or the like.

3. In a microscope illumination device, the combination of a rear housing section, a front housing section in alignment with said rear housing section, a relatively low intensity substantially continuous light source mounted in said rear housing section, a condenser lens system slidably mounted in said front housing section and establishing an optical projection axis, said condenser lens system being longitudinally adjustable along said axis and toward and away from said relatively low intensity light source, a reflector mounted in said rear housing section and having a concave spherical reflecting surface intersecting said axis and facing said condenser lens system, said concave spherical surface having its center of curvature disposed substantially at a predetermined location on said optical axis, said relatively low intensity light source being transversely positioned so as to intersect said optical axis at a point between said reflecting surface and said center of curvature, and at a first predetermined distance from said center of curvature, said reflector reflecting light from said low intensity light source and forming an image thereof substantially at an image plane transversely intersecting said optical axis at a point a second predetermined distance substantially equal to said first predetermined distance from the opposite side of said center of curvature, an intermediate housing section readily removably positioned upon said front housing section and readily removably supporting said rear housing section thereon, and a relatively high intensity light source of short duration carried by said intermediate housing section and located substantially at said image plane and in axial alignment with said condenser lens system, said condenser lens system being axially adjustable so as to focus at said image plane and collect light rays emanating from said high intensity light source or said low intensity light source and form same into a concentrated beam for use with the optical system of a microscope or the like.

4. In a microscope illumination device, the combination of a rear housing section, a front housing section in alignment with said rear housing section, a relatively low intensity substantially continuous light source mounted in said rear housing section, a condenser lens system slidably mounted in said front housing section and establishing an optical projection axis, said condenser lens system being longitudinally adjustable along said axis and toward and away from said relatively low intensity light source, a reflector mounted in said rear housing section and having a concave spherical reflecting surface intersecting said axis and facing said condenser lens system, said concave spherical surface having its center of curvature disposed substantially at a predetermined location on said optical axis, said relatively low intensity light source being transversely positioned so as to intersect said optical axis at a point between said reflecting surface and said center of curvature, and at a first predetermined distance from said center of curvature, said reflector reflecting light from said low intensity light source and forming an image thereof substantially at an image plane transversely intersecting said optical axis at a point a second predetermined distance substantially equal to said first predetermined distance from the opposite side of said center of curvature, an intermediate housing section readily removably positioned upon said front housing section and readily removably supporting said rear housing section thereon, a relatively high intensity light source of short duration carried by said intermediate housing section and located substantially at said image plane and in axial alignment with said condenser lens system, and a diaphragm carried by said intermediate housing section between said high intensity light source and said condenser lens system and disposed closely adjacent said high intensity light source, and having an opening of controlled size therein for restricting the usable area of the light at said image plane exposed to said condenser lens system, said condenser lens system being axially adjustable so as to focus at said image plane and collect light rays emanating from said high intensity light source or said low intensity light source and form same into a concentrated beam for use with the optical system of a microscope or the like.

5. In a microscope illumination device, the combination of a condenser lens system establishing an optical projection axis, a reflector having a concave spherical reflecting surface intersecting said axis and facing said condenser lens system, said concave spherical surface having its center of curvature disposed substantially at a predetermined location on said optical axis, a relatively low intensity substantially continuous source of illumination and a relatively high intensity source of illumination of short duration for said device, one of said light sources being transversely positioned so as to intersect said optical axis at a first axial point and the other of said light sources being transveresly positioned so as to intersect said optical axis at a second axial point, said first and second axial points being spaced equal predetermined distances from and at opposite sides, respectively, of said center of curvature, the light source disposed between said reflector and said center of curvature having light rays therefrom reflected by said reflector so as to form an image thereof at an image plane transversely disposed substantially at the other of said axially spaced points, said condenser lens system being axially adjustable so as to focus at said image plane and collect light rays emanating from said high intensity light source or from said low intensity light source and form same into a concentrated beam for use with the optical system of a microscope or the like.

6. The combination set forth in claim 5 and including a diaphragm disposed between the light source at said image plane and said condenser lens system and closely adjacent the former, said diaphragm having an axially aligned opening of control size therein for restricting the usable area of the light at said image plane exposed to said condenser lens system.

References Cited in the file of this patent

UNITED STATES PATENTS

| | | |
|---|---|---|
| 2,190,294 | Mili | Feb. 13, 1940 |
| 2,277,697 | Grier | Mar. 31, 1942 |
| 2,278,916 | Critoph et al. | Apr. 7, 1942 |
| 2,319,207 | Clarkson | May 18, 1943 |
| 2,319,489 | Carlson | May 18, 1943 |
| 2,406,320 | Chubb | Aug. 27, 1946 |
| 2,542,311 | Carlson | Feb. 20, 1951 |
| 2,587,956 | Bastien | Mar. 4, 1952 |